United States Patent
Lutz et al.

(10) Patent No.: US 10,114,961 B2
(45) Date of Patent: Oct. 30, 2018

(54) OPERATOR SYSTEM FOR A PROCESS CONTROL SYSTEM

(71) Applicant: Siemens Aktiengesellschaft, Munich (DE)

(72) Inventors: Benjamin Lutz, Pfinztal (DE); Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/875,624

(22) Filed: Jan. 19, 2018

(65) Prior Publication Data

US 2018/0218161 A1    Aug. 2, 2018

(30) Foreign Application Priority Data

Jan. 27, 2017    (EP) .................................... 17153570

(51) Int. Cl.
| | | |
|---|---|---|
| *G06F 17/30* | (2006.01) | |
| *G06F 21/62* | (2013.01) | |
| *G06F 21/31* | (2013.01) | |
| *G06F 21/45* | (2013.01) | |
| *G06F 21/60* | (2013.01) | |

(52) U.S. Cl.
CPC .............. *G06F 21/62* (2013.01); *G06F 21/31* (2013.01); *G06F 21/45* (2013.01); *G06F 21/604* (2013.01); *G06F 2221/2141* (2013.01)

(58) Field of Classification Search
CPC ........ G06F 21/31; G06F 21/45; G06F 21/602; G06F 21/62
USPC ........................................................... 726/2
See application file for complete search history.

(56) References Cited

U.S. PATENT DOCUMENTS

2010/0263018 A1    10/2010    Cozart et al.
2010/0281522 A1*   11/2010    Hatakeyama ........... G06F 21/33
                                                            726/4

(Continued)

FOREIGN PATENT DOCUMENTS

WO    WO2008/022606    2/2008

OTHER PUBLICATIONS

SIEMENS: "SIMATIC PCS 7 Process Control System, System Components" siemens.com/simatic-pcs7 Catalog ST PCS 7 Edition 2016, pp. 101-121.

*Primary Examiner* — Haresh N Patel
(74) *Attorney, Agent, or Firm* — Cozen O'Connor

(57) ABSTRACT

An operator system for a process control system, wherein the operator system includes an operator server and at least one operator client connected to the operator server, where operators authenticate with respective login data via the at least one operator client or via a plurality of operator clients of the operator system on an authentication server and the authentication server generates, for each of the authenticated operators one operator-specific data record, in which an access or functional right to at least one operator server application is stored such that during the operating and monitoring of a process to be controlled, access or functional rights can be temporarily transferred from one of the operators to the other operator in a secure manner with respect to the security aspects, without which end changes would need to be made in an access and functional rights list via an engineering system.

7 Claims, 2 Drawing Sheets

(56) References Cited

U.S. PATENT DOCUMENTS

| | | | | |
|---|---|---|---|---|
| 2013/0174223 | A1* | 7/2013 | Dykeman | G06F 21/10 726/4 |
| 2013/0176106 | A1* | 7/2013 | Schultz | G08C 17/02 340/5.52 |
| 2014/0258531 | A1* | 9/2014 | Sarda | H04B 5/0031 709/225 |
| 2015/0101032 | A1* | 4/2015 | Shimakawa | G06F 21/41 726/8 |
| 2015/0269360 | A1* | 9/2015 | Abe | G06F 21/604 713/193 |
| 2016/0134425 | A1* | 5/2016 | Peterson | G06F 21/6218 713/176 |
| 2016/0234213 | A1* | 8/2016 | Kim | H04W 4/70 235/382 |
| 2016/0283699 | A1* | 9/2016 | Levin | G06F 21/10 235/382 |
| 2017/0180327 | A1* | 6/2017 | Levin | H04L 63/04 235/382 |
| 2017/0221288 | A1* | 8/2017 | Johnson | G07C 9/00087 235/382 |
| 2017/0228665 | A1* | 8/2017 | Levin | G06Q 10/02 235/382 |
| 2018/0005465 | A1* | 1/2018 | Truong | G07C 9/00079 235/382 |
| 2018/0025295 | A1* | 1/2018 | Levin | H04W 4/008 235/382 |
| 2018/0069864 | A1* | 3/2018 | Cernoch | G06F 21/44 235/382 |

* cited by examiner

Op1;
securityArea."Teilanlage1";
FR:"view"

Op2;
securityArea."Teilanlage1";
FR:"view"
notUseAfter: TT.MM.YYYY

OPERATOR SYSTEM FOR A PROCESS CONTROL SYSTEM

BACKGROUND OF THE INVENTION

1. Field of the Invention

The invention relates to an operator system for a process control system having an operator server and at least one operator client connected to the operator server, where operators authenticate with respective login data via the at least one or via various operator clients of the operator system on an authentication server and the authentication server generates for each authenticated operator one operator-specific data record, in which an access right to at least one operator server application is stored, and where an access control of the operator server is configured to compare a respective operator-specific data record with respective access authority data records stored on the operator server and, as a function of the respective comparison result, to permit the respective operator to access the at least one operator server application or to prevent the respective operator from access the at least one operator server application.

2. Description of the Related Art

Siemens catalog "ST PCS7", chapter 5, 2016 edition discloses a conventional operator system. This conventional operator system, which has at least one operator server and at least one operator client, is configured to enable a convenient and safe process control, where an operator can monitor the process workflow and engage in a controlling manner if necessary.

There may be instances in which an operator must be represented by another operator for a short time. In order to ensure that the other operator is able to have access to applications or projects of the first operator, the first operator is required to initially sign off or logs out and the other operator must then sign on or log in. By doing so, the other operator can then only have access to the applications or the projects of the first operator, if the other operator has precisely the same access or functional rights as those of the first operator. In the event that the first operator would like to resume his work after a short time, the other operator has to log out again and the first operator must then log in again.

Particularly in the event that the first operator is to be represented by a multiplicity of further operators, corresponding access and functional rights must be included in the planning in advance for all of these further operators. This also then applies if a temporary representation is only to be included in the planning for the event of an emergency and, furthermore, the probability is negligibly low that the representation is actually to be undertaken for each individual potential representative included in the planning. Due to the numerous representatives with the same access and functional rights to be populated in a corresponding list, the list with the registered representatives and associated access and functional rights will become increasingly extensive, which leads to an increase in administrative expenses as well as to extensive data volumes and thus to problems that can be disruptive with respect to the availability of a plant to be controlled.

SUMMARY OF THE INVENTION

In view of the foregoing, it is therefore and object of the invention to provide an operator system having an operator server and at least one operator client connected to the operator server, where operators authenticate with respective login data via the at least one or via various operator clients of the operator system on an authentication server and the authentication server generates for each authenticated operator one operator-specific data record, in which an access right to at least one operator server application is stored, and where an access control of the operator server is configured to compare a respective operator-specific data record with respective access authority data records stored on the operator server and, as a function of the respective comparison result, to permit the respective operator to access the at least one operator server application or to prevent the respective operator from access the at least one operator server application, via which a temporary representation of an operator by another operator is simplified.

This and other objects and advantages are achieved in accordance with the invention by an operator system in which the access control is furthermore configured to transfer the access right from an first operator to another operator temporarily. In accordance with the invention, if the first and the other operator are authenticated, then the access authority data record stored on the operator server for the first operator comprises an indication, which notifies the access control that the access right of the first operator can be transferred temporarily, where the access authority data record stored on the operator server for the other operator comprises an indication, which notifies the access control that the other operator is permitted to accept the temporary access right.

An advantage is that the access and functional rights of an operator can be transferred to another operator in a flexible, dynamic and temporary manner, whereby the availability of a plant to be controlled is increased. The administrative expenses and the data volumes are reduced, because the corresponding lists or tables with access or functional rights of the operators can be optimized. Only dedicated (as a rule very few) operators or users are "permanently included in the planning". Moreover, by allocating the necessary access and functional rights to the further operators for a short time period these further operators can "step in" as required. Furthermore, it is advantageous that a contribution is made to maintaining what is known as the "minimality principle" from the NAMUR recommendation (NAMUR worksheet 115 "IT-Security for Industrial Automation Systems: Constraints for measures applied in process industries"). This principle purports that each user may only be granted as many rights as he/she actually requires ("as many rights as necessary and as few rights as possible").

The invention is based on the idea of, during the operator control and monitoring of a process to be controlled, temporarily transferring access or functional rights in a secure manner with respect to the security aspects, without these end changes having to be made in an access and functional rights list via an engineering system. An operator, who is logged on via an operator client, can temporarily "pass on" his functional rights to a further operator, where the further operator then possesses the access and functional rights of the first operator, but uses the "claim" of the further operator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawings in which exemplary embodiments of the invention are illustrated, in which.

DETAILED DESCRIPTION OF THE EXEMPLARY EMBODIMENTS

Figure 1:
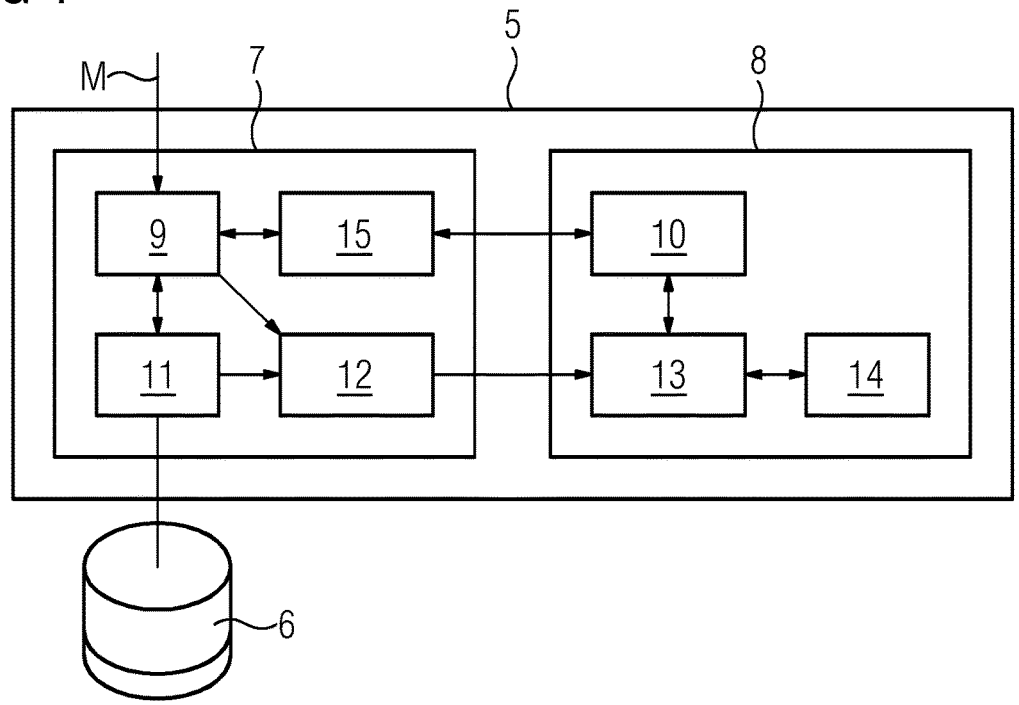
FIGS. 1 and 2 show constituent parts of an access control of an operator server in accordance with the invention.
Figure 2:
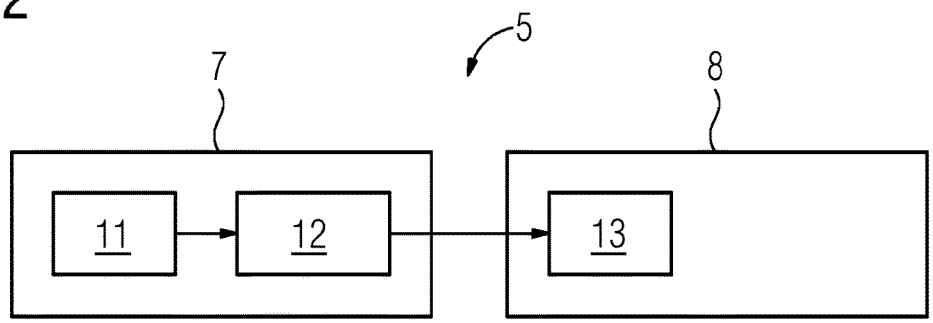
Figure 3:
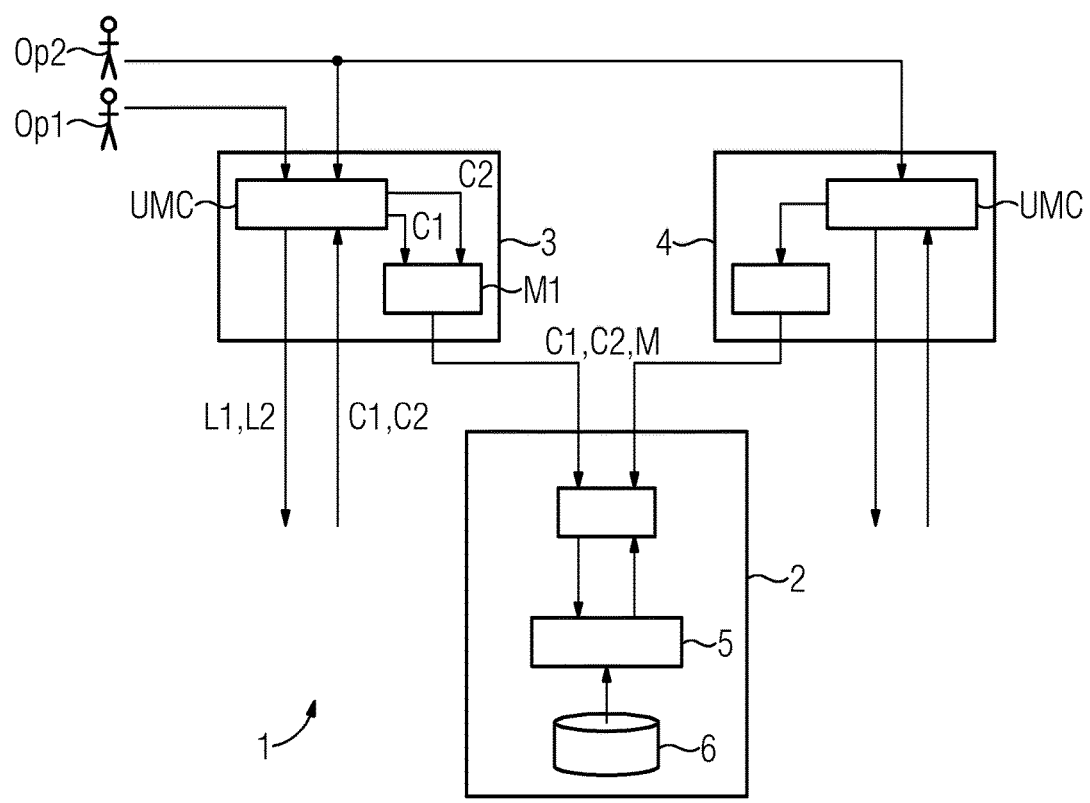
FIG. 3 shows an operator system in accordance with the invention.

The same parts shown in FIGS. 1 to 3 are provided with the same reference characters.

With initial reference to FIG. 3, shown therein is an operator system 1. In the present exemplary embodiment, the operator system 1 consists of an operator server 2 (labeled as an OS server below) and two operator clients 3, 4 connected to the OS server 2. It should be under stood the operator system 1, which is provided for operator control and monitoring of a technical process to be controlled or of a plant to be controlled, can have further operator clients (labeled as OS clients below). In order to have access to an operator server application capable of being executed in the OS server 2, such as an application in the form of a piece of operator control and monitoring software or an operator control and monitoring tool, and therefore to be able to use the application, an operator or user is required to authenticate him/herself. An operator server application is understood to be an application that is primarily executed or processed on the OS server, where parts of the application, such as the output of images or results of a calculation, are visualized on one or on each of the clients 3, 4.

It is assumed in the following that a first operator Op1 ordinarily authenticates him/herself on the client 3 and a second operator Op2 ordinarily authenticates him/herself on the client 3 or 4. The authentication is effected, such that the first operator Op1 initially authenticates via a suitable User Management Component (UMC) with his/her user name and his/her password, which represent login data Li1, on an authentication server (not shown here). In the event that the first operator Op1 can authenticate with his/her login data L1 on the authentication server, which indicates that the first operator Op1 is an authorized user of the operator system 1, the authentication server generates an operator-specific data record C1 (referred to as a claim below) based on the login data L1 for the authenticated operator and transfers the claim C1 to the OS client 3 of the operator system 1, onto which the operator Op1 has logged on.

The claim C1 comprises a multiplicity of information, such as information on the successful login of the first operator Op1, the user name of the first operator Op1, access or functional rights regarding the use of one or a plurality of operator server applications, on the period of usage of the applications and/or the usage type (full access, read-only access, write access, . . . ), where the user management component UMC of the client 3 directs the claim C1 to an access control 5 of the OS server 2. The access control 5 compares the claim C1 with parts of access authority data records, allocated or associated with the claim C1, of a configuration file 6 which as part of a project engineering and configuration has been generated via an engineering system (not shown) and stored on the OS server 2. As a function of the comparison result, the access control 5 permits or prevents the authorized or authenticated operator Op1 from accessing the operator server application.

In order to enable the first operator Op1 to temporarily transfer his/her access or functional rights to the second operator Op2, the access authority data record of the first operator Op1 stored in the configuration file 6 has an indication that notifies the access control 5 that the access or functional right of the first operator Op1 can be transferred to the second operator Op2. The indication can be formulated such that the access right can also be transferred to a further authenticated operator, a group of authenticated operators or even any of the authenticated operators. Furthermore, the access authority data record of the second operator Op2 stored in the configuration file 6 is provided with an indication that notifies the access control 5 that the second operator Op2 can or is permitted to accept the access or functional right of the first operator. Here, the indication can also be formulated such that the access right can be accepted by a further authenticated operator, a group of authenticated operators or even any of the authenticated operators.

The transfer of the access rights from the first authenticated or logged-in operator Op1 to the second authenticated or logged-in operator Op2 is initiated by the first operator Op1. Based on a suitable input on the OS client 3, the OS client 3 of the access control transmits a method call, which is provided to pass on or to accept the access right and initiates the passing on.

The input of the first operator Op1 on the OS client 3 can be effected in a menu-driven manner, for example, where the first operator Op1 enters the user name of the second operator Op2 as his temporary representative in a control panel (login field) of an input screen and enters a time indication for the duration of the temporary representation in a further control panel. Based on this input, a method call M "checkRights(claim1,securityArea,FR,sig1,claim2,notuseAfter,sig2)"

is generated automatically via a component M1 of the client 3, where the parameters of the method call M mean:

claim1: the operator-specific data record C1 of the first operator Op1, claim2: an operator-specific data record C2 of the second operator Op2, securityArea: the security area, for which the operator server application is provided, FR: the access or functional right to the operator server application (e.g. visualization of a plant or an image hierarchy on the OS client), sig1: an integrity feature or signature for protecting claim1 from manipulation, where sig1 is a signature sig1=Sig_Gen(claim1||securityArea||FR) generated regarding the three data items or data records claim1, securityArea and FR, which are concatenated with one another, using a private key (of the first operator), Sig_Gen is a signature generating method and the character "||" means the concatenation, notUserAfter: the validity period or time limitation of the transferring of the access or functional right, and sig2: an integrity feature or signature for protecting claim2 from manipulation, where sig2 is a signature sig2=Sig_Gen(claim2||notUseAfter) generated regarding the two data items or data records claim2 and notUseAfter, which are concatenated with one another, using a private key (of the second operator), where Sig_Gen is once again a signature generating method and the character "||" once again means the concatenation.

In the event that the first operator Op1 wishes to be represented by the second operator Op2, but the second operator Op2 has not yet logged in or authorized himself, the described method call "checkRights" opens the login field in the OS client 3 of the first operator Op1, with which the second operator Op2 has to authenticate or authorize himself on the authentication server via his login data Li2 ("ordinary handover"), where the authentication server for the second operator Op2 directs the operator-specific data record C2 (claim 2) to the UMC component UMC of the OS client 3. During this authentication (as explained) the signature "sig2" regarding the data records "claim2" and "notUseAfter", which are concatenated with one another, is generated using the private key of the second operator Op2, in order to contribute to the protection from unauthorized manipulation or an attempt to obtain the functional rights without authorization sig2=Sig_Gen(claim1||notUseAfter). If the signature verification of the signatures sig1 and sig2 (using the publicly available public key of the operators Op1, Op2) has the result that the signatures are valid, then (as described) a check is performed to determine whether the first operator Op1 is permitted to transfer or pass on the access or functional right and whether the second operator Op2 is permitted to accept the access or functional right. If the checking has been performed successfully, then the transfer of the access or functional right is "initiated" via the method call M "checkRights".

With continued reference to FIGS. 1 and 2, constituent parts of the access control 5 of the operator server 2 are depicted in FIG. 3. Here, the access control 5 has a first and a second control component 7, 8, where the first control component 7 processes the operator-specific parameters "claim1,securityArea,FR,sig1" of the method call M ("checkRights") for the first operator Op1 and the second control component 8 processes the operator-specific parameters "claim2,notuseAfter,sig2" of said method call M ("checkRights") for the second operator Op2. The first and the second control component 7, 8 are each provided with a checking component 9, 10, where the checking component 9 of the first control component 7 stores the operator-specific parameters of the operators Op1, Op2 in its cache 11. A replicator 12 of the first control component 7 causes the access or functional right "FR" for the security area "securityArea" as well as the validity period of the access right to be read from the cache 11 and stored in a cache 13 of the second control component 8, where the replicator 12 replaces the user name of the first operator Op1 (known from claim C1 of the first operator Op1) with the user name of the second operator Op2 (known from the claim C2 of the second operator Op2) (see FIG. 2).

From this point in time, the second operator Op2 now possesses the same access or functional right with respect to the operator server application, e.g., the access or functional right with respect to a piece of software for visualization (viewing) of a plant or an image hierarchy, where the access or functional right is restricted to the predefined or designated security area (securityArea, e.g., subsystem 1) and the predefined or designated period of time or duration (notUseAfter: DD.MM.YYYY). If, for this application, the temporarily transferred or assigned functional right is now checked via the method call M ("checkRights( . . . )") for the second operator Op2, then the checking component 9 of the first control component 7 will initially transmit a "false" (access denied) to the OS client 3, because a corresponding access or functional right is not initially present for the second operator Op2 in the configuration file 6. At the same time, however, the same check is performed via a component 15 in the checking component 10 of the second control component 8, because administration of the temporarily transferred or assigned functional right occurs at this location. In the event the second control component 8 transmits a "true" (access granted) to the OS client 3 for the checked or queried access or functional right, the application is released for the second operator Op2.

Based on the fact that access or functional rights are only handed over temporarily or for a limited time, the cache 13 of the second control component 8 is regularly adjusted for obsolete entries ("notUseAfter" expired) by a component 14 of said second control component 8. Due to the cache replication, all temporarily assigned functional rights are volatile, which means that in the event of a restart of the operator system 1, these rights become lost and, if necessary, must be transferred once again.

The access authority data records stored in the configuration file 6 can furthermore each comprise a further indication, which notifies the access control 5 that an operator or an automatic instance is permitted to accept the role of a "confirmer". This means that the confirmer must accept a transfer of an access or functional right from the first operator Op1 to the second operator Op2, for example, before the access or functional right can be transferred. As a result, a high security level can be achieved. In the event that a further operator accepts the role of "confirmer", this further operator can confirm he/she accepts the transfer of rights via his/her login. Here, the previously mentioned parameter of the method call M "(claim1,securityArea,FR,sig1 claim2,notuseAfter,sig2)"

is signed using the "private key" of the further operator and supplemented by the signature "sig3", so that the parameter data record reads:

"(caim1,securityArea,FR,sig1, claim2,notuseAfter,sig2, sig3)".

Alternatively, in order to generate the signature "sig3", the inclusion of the confirmer may be technically implemented by the use of what is known as a confirmer signature method (designated confirmer signature) to generate the signature "sig2". Here, along with the private key of the second operator Op2, the freely available public key of the further operator is used to generate the signature "sig2", which causes an interaction with the further operator, in which he/she uses his private key, to be required during the verification of the signature "sig2". As the generation of the signature "sig3" is not required here, this approach is much more efficient than the approach that includes generation of the signature "sig3".

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodi-

What is claimed is:

1. An operator system for a process control system, comprising:
    an operator server; and
    at least one operator client connected to the operator server;
    wherein operators authenticate with respective login data via the at least one operator client or a plurality of operator clients of the operator system on an authentication server which generates for each authenticated operator one operator-specific data record, in which an access right to at least one operator server application is stored;
    wherein an access control of the operator server is configured to compare a respective operator-specific data record with respective access authority data records stored on the operator server and configured to, as a function of a respective comparison result, one of (i) permit the respective operator to access the at least one operator server application and (ii) prevent access of the respective operator to the at least one operator server application;
    wherein the access control is further configured to transfer the access right from one operator to another operator temporarily, if the one operator and the other operator are authenticated;
    wherein the access authority data record stored on the operator server for the one operator comprises an indication which notifies the access control that the access right of the one operator can be transferred temporarily; and
    wherein the access authority data record stored on the operator server for the other operator comprises an indication which notifies the access control that the other operator is permitted to accept the temporary access right.

2. The operator system as claimed in claim 1, wherein the access control causes the transfer of the access right from the one operator to the other operator by the access control executing a method call initiated by the one authenticated operator and directed to the access control, which comprises operator-specific parameters;
    wherein, for the one operator, the operator-specific parameters include at least the operator-specific data record of the one operator and the operator server application to which the access right for the one operator relates; and
    wherein, for the other operator, the operator-specific parameters include at least the operator-specific data record of the other operator and a time indication or time span which represents a time restriction of the access right by the other operator.

3. The operator system as claimed in claim 2, wherein the access control includes a first and a second control component; and
    wherein the first control component processes the operator-specific parameters of the method call for the one operator and the second control component processes the operator-specific parameters of the method call for the other operator.

4. The operator system as claimed in claim 3, wherein one signature is formed from the operator-specific parameters of the one operator and another signature is formed from the operator-specific parameters of the other operator, said signature being constituent parts of the method call.

5. The operator system as claimed in claim 2, wherein the operator-specific parameters for the one operator and the other operator each additionally include as parameters an indication of a security area for which the operator server application is provided.

6. The operator system as claimed in claim 5, wherein one signature is formed from the operator-specific parameters of the one operator and another signature is formed from the operator-specific parameters of the other operator, said signature being constituent parts of the method call.

7. The operator system as claimed in claim 2, wherein one signature is formed from the operator-specific parameters of the one operator and another signature is formed from the operator-specific parameters of the other operator, said signature being constituent parts of the method call.

* * * * *